(12) United States Patent
Fukumoto et al.

(10) Patent No.: US 11,151,340 B2
(45) Date of Patent: Oct. 19, 2021

(54) RFID TAG AND RFID TAG SYSTEM

(71) Applicant: KYOCERA Corporation, Kyoto (JP)

(72) Inventors: Katsuhiko Fukumoto, Yokohama (JP); Yuichi Tanaka, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 17/055,265

(22) PCT Filed: May 17, 2019

(86) PCT No.: PCT/JP2019/019630
§ 371 (c)(1),
(2) Date: Nov. 13, 2020

(87) PCT Pub. No.: WO2019/225493
PCT Pub. Date: Nov. 28, 2019

(65) Prior Publication Data
US 2021/0124884 A1     Apr. 29, 2021

(30) Foreign Application Priority Data

May 23, 2018   (JP) .............................. JP2018-098366

(51) Int. Cl.
*G06K 7/10*     (2006.01)
*G06K 19/07*    (2006.01)

(52) U.S. Cl.
CPC ..... *G06K 7/10386* (2013.01); *G06K 19/0723* (2013.01); *G06K 2007/10524* (2013.01)

(58) Field of Classification Search
CPC ............. G06K 7/00; G06K 7/08; G06K 7/081
USPC .......................... 235/451, 439, 435, 487, 375
See application file for complete search history.

(56) References Cited

U.S. PATENT DOCUMENTS

| | | | |
|---|---|---|---|
| 2005/0170784 A1* | 8/2005 | Ariyoshi | H04B 5/00 455/67.13 |
| 2007/0176772 A1* | 8/2007 | Nemoto | G06K 19/0723 340/539.22 |
| 2007/0285238 A1* | 12/2007 | Batra | G06K 7/0008 340/572.1 |
| 2009/0243832 A1* | 10/2009 | Hyde | A01G 25/167 340/505 |
| 2012/0044058 A1* | 2/2012 | Shiotsu | G06K 19/0717 340/10.5 |

FOREIGN PATENT DOCUMENTS

JP        2016-192179 A     11/2016

* cited by examiner

*Primary Examiner* — Edwyn Labaze
(74) *Attorney, Agent, or Firm* — Volpe Koenig (57) ABSTRACT

An RFID tag includes an RFID device and a controller. The RFID device includes a storage into which data is writable from a writing apparatus through wireless communication. The controller reads object information of output stored in the storage and causes an output device to output the read object information. In response to the object information being written into the storage, the controller reads the object information after an elapse of a set waiting time. The storage includes a storage region into which setting data of the waiting time is writable from the writing apparatus.

6 Claims, 7 Drawing Sheets

RFID TAG AND RFID TAG SYSTEM

TECHNICAL FIELD

The present disclosure relates to an RFID (Radio Frequency Identifier) tag and an RFID tag system that are capable of outputting information.

BACKGROUND ART

There have been cases where an RFID tag having a display is used by being attached to an article, a receptacle for an article, or the like. An RFID tag having a display has a storage into which data is writable through wireless communication and a controller that controls the display. By rewriting information in the storage with a dedicated reader/writer, display content is updatable. There has been proposed a technique of, in an RFID tag having a display, detecting failure of the display. (See JP 2016-192179 A.)

SUMMARY OF INVENTION

Solution to Problem

An RFID tag according to the present disclosure includes:
an RFID device including a storage into which data is writable from a writing apparatus through wireless communication; and
a controller that reads object information of output stored in the storage and causes an output device to output the read object information,
wherein in response to the object information being written into the storage, the controller reads the object information after an elapse of a set waiting time, and
wherein the storage includes a storage region into which setting data of the waiting time is writable from the writing apparatus.

An RFID tag system according to the present disclosure includes:
an RFID tag; and
a writing apparatus capable of writing data into the RFID tag through wireless communication,
wherein the RFID tag includes:
an output device capable of outputting information;
an RFID device including a storage into which data is writable and an antenna; and
a controller that reads object information of output stored in the storage and causes the output device to output the read object information,
wherein in response to the object information being written into the storage, the controller reads the object information after an elapse of a set waiting time, and
wherein the storage includes a storage region into which setting data of the waiting time is writable from the writing apparatus.

Advantageous Effects of Invention

According to the present disclosure, setting data of the waiting time can be written into the storage of the RFID device by using the writing apparatus. Writing appropriate setting data thereof can produce an effect of preventing competition between the writing process by the writing apparatus and the reading process by the controller even when the data length of information that is written into the RFID tag at the time of an update of output information is long.

DESCRIPTION OF EMBODIMENTS

Figure 1:
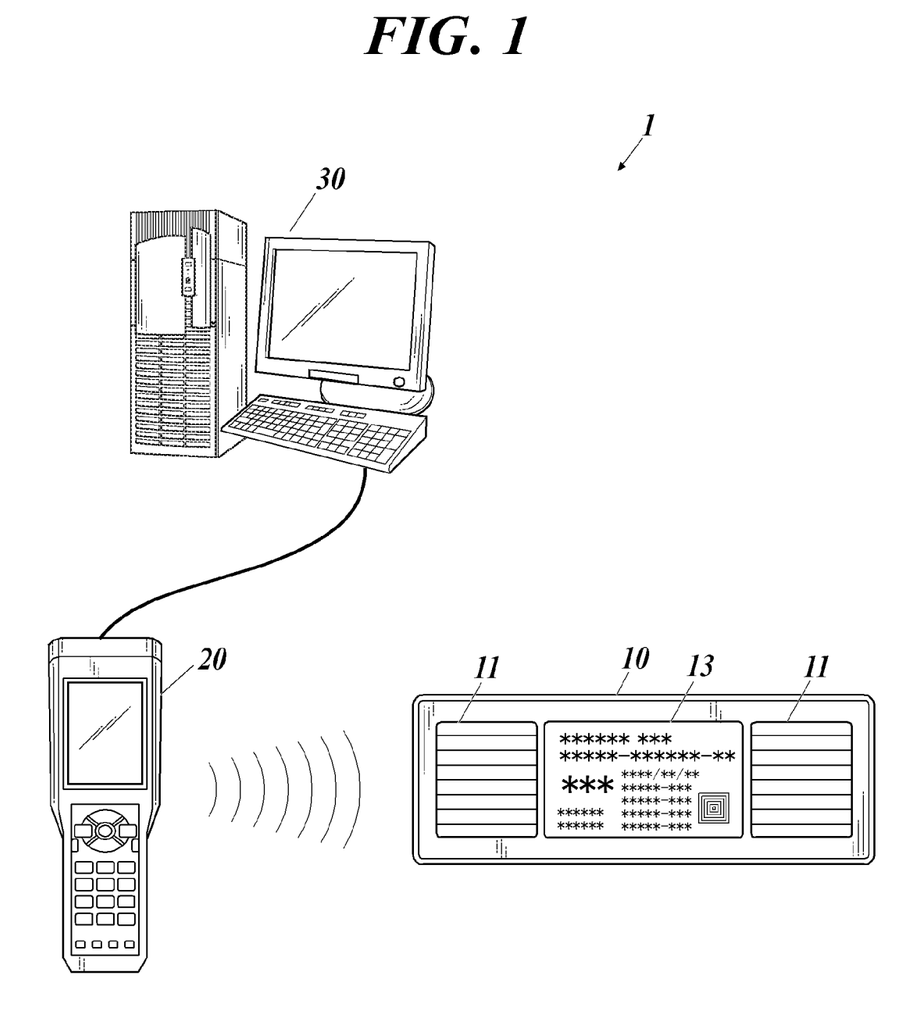
FIG. 1 is an illustration showing an RFID tag system according to an embodiment(s) of the present disclosure.
Figure 2:
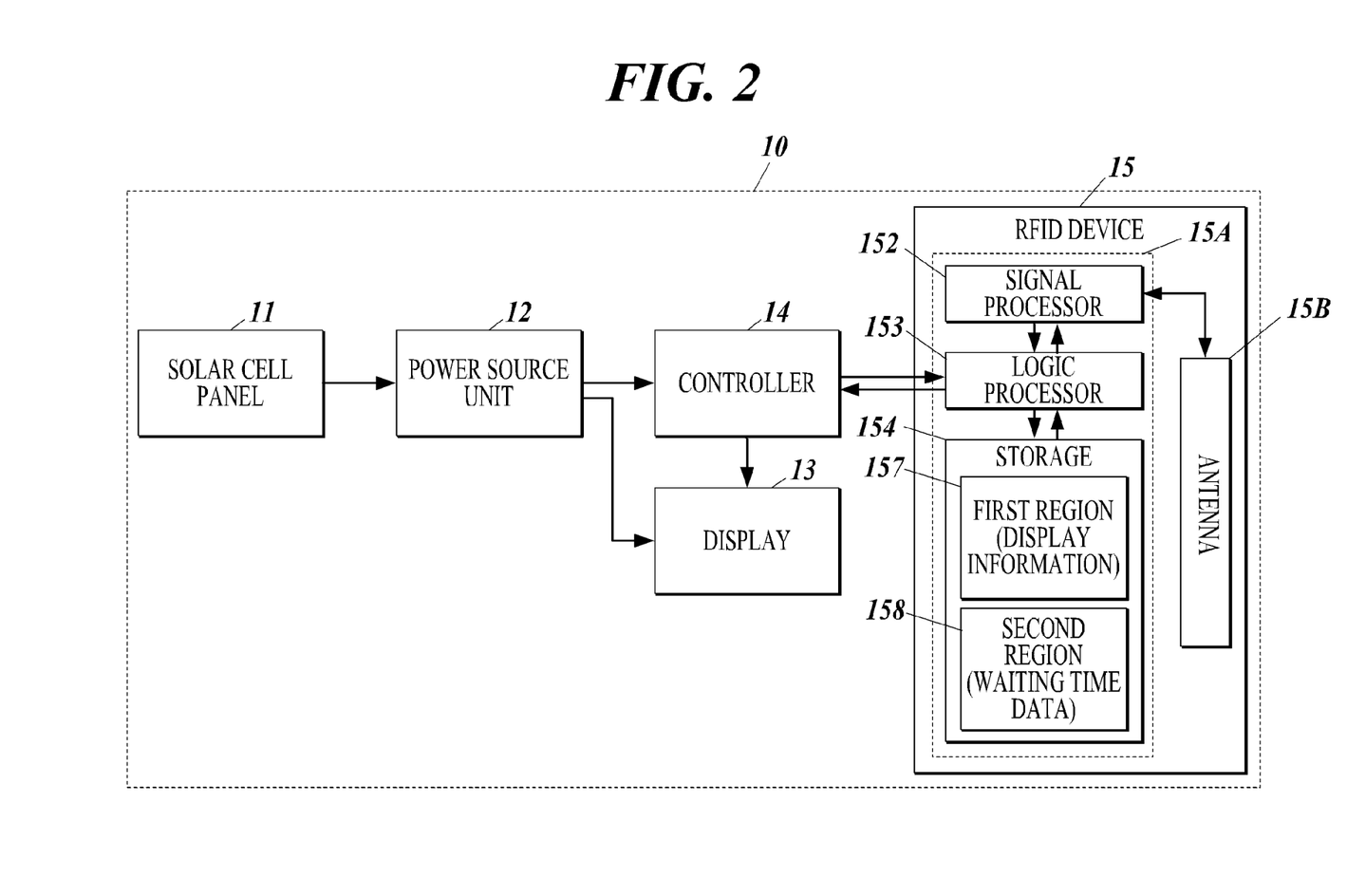
FIG. 2 is a block diagram showing an internal configuration of an RFID tag shown in FIG. 1.

Hereinafter, an embodiment(s) of the present disclosure will be described in detail with reference to the drawings. FIG. 1 is an illustration showing an RFID tag system according to an embodiment(s) of the present disclosure. FIG. 2 is a block diagram showing an internal configuration of an RFID tag.

An RFID tag system 1 according to this embodiment includes an RFID tag 10 having an information output function, a reader/writer 20 capable of writing and reading information into and from the RFID tag 10 through wireless communication, and a host computer 30. The host computer 30 is connected to the reader/writer 20, and, for example, manages writing information and totalizes read information. Among these components, the reader/writer 20 corresponds to an example of a writing apparatus according to the present disclosure.

The RFID tag 10 includes: a solar cell panel 11; a power source unit 12 that supplies a power-source voltage to each component; a display 13, such as a liquid crystal panel; a controller 14 that controls the display 13; and an RFID device 15. The display 13 corresponds to an example of an output device according to the present disclosure.

The power source unit 12 accumulates power supplied from the solar cell panel 11, generates a power-source voltage for control and a power-source voltage for display, and supplies these power-source voltages to the controller 14 and the display 13, respectively.

The controller 14 is a microcomputer including a CPU (Central Processing Unit), a storage where a control program (s) and control data are stored, and an interface for exchanging signals with the outside. The controller 14 outputs a drive signal(s) for display to the display 13 to control display content of the display 13, and reads information from a storage 154 of the RFID device 15 by communicating with the RFID device 15 through a cable.

The RFID device 15 is configured by mounting an IC (Integrated Circuit) chip 15A for an RFID tag on a circuit board where an antenna 15B for wireless communication is disposed. The IC chip 15A includes a signal processor 152 that demodulates and modulates radio signals, a logic processor 153 that performs a predetermined type(s) of logic processing, and the storage 154 where data is stored.

The logic processor 153 receives requests, an address and information from the reader/writer 20 through the signal processor 152. The logic processor 153 writes information into the storage 154 on the basis of a writing request, and also reads information from the storage 154 on the basis of a reading request and sends the information to the reader/writer 20 through the signal processor 152. The logic processor 153 also receives requests and an address from the controller 14. The logic processor 153 reads information from the storage 154 on the basis of a reading request and sends the information to the controller 14. Further, when writing information into the storage 154 on the basis of a writing request from the reader/writer 20, the logic processor 153 outputs, to the controller 14, an interrupt signal that corresponds to a notification of an update of information.

The storage 154 is, for example, a rewritable nonvolatile memory, and includes a storage region for identification information, a first region 157 where display information is stored, and a second region 158 where setting data of waiting time data and so forth is stored. The first region 157 and the second region 158 are regions where data is rewritable from the reader/writer 20. The display information corresponds to an example of "object information of output" according to the present disclosure. The second region 158 corresponds to an example of a "storage region into which setting data of a waiting time is writable" according to the present disclosure.

<Control Process>

Figure 3:
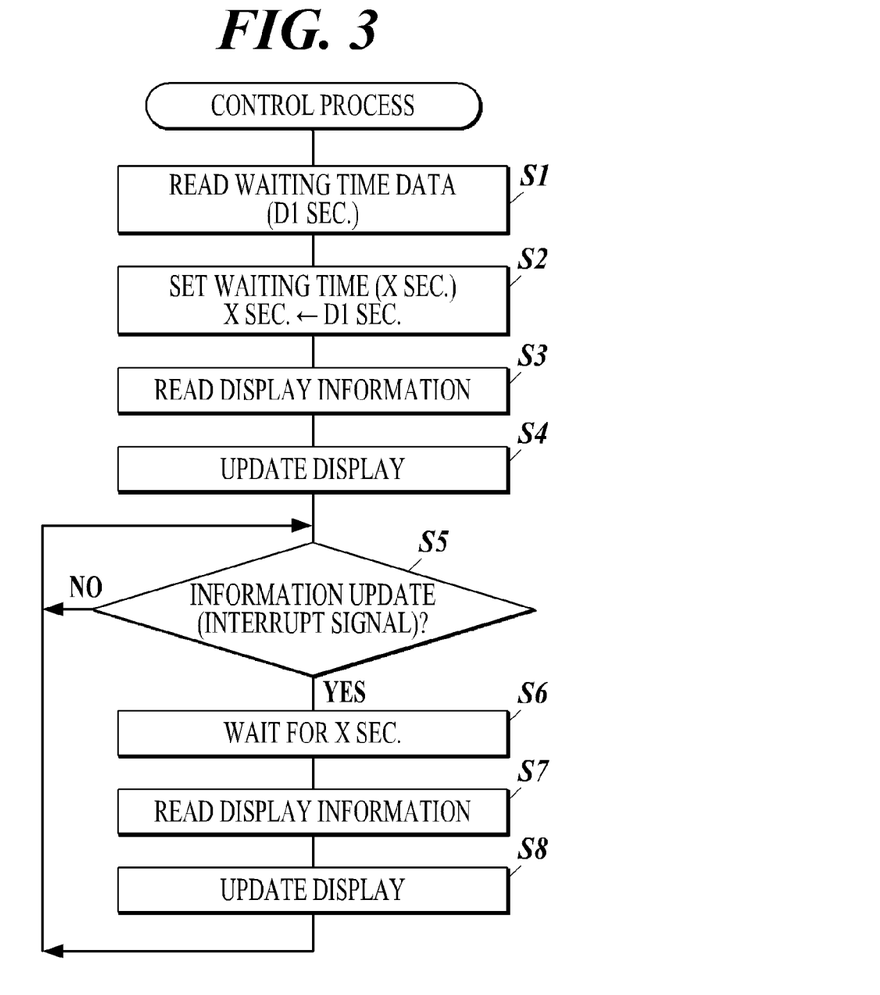
FIG. 3 is a flowchart showing a procedure of a control process that is performed by a controller.

Next, a control process that is performed by the controller 14 will be described. FIG. 3 is a flowchart showing a procedure of the control process. The controller 14 starts the control process at the time of start-up; for example, at the time of power-on or at the time of resetting.

When starting the control process, the controller 14 first makes a reading request to the RFID device 15 to read waiting time data from the second region 158 of the storage 154 (Step S1). In an example, a value of "D1 sec." is read from the second region 158. Next, the controller 14 sets the value "D1 sec." read in Step S1 as a waiting time (X sec.) (Step S2), which is one of operation parameters in the control process shown in FIG. 3.

Next, the controller 14 reads display information from the first region 157 of the storage 154 of the RFID device 15 (Step S3). Then, the controller 14 drives the display 13 in accordance with the read display information to update the display content (Step S4). Thus, at the time of power-on or at the time of resetting, the display 13 displays predetermined information written in the RFID device 15.

Next, the controller 14 stops until an interrupt signal is input (Step S5). The interrupt signal is output from the logic processor 153 to the controller 14 when information is written into the storage 154 of the RFID device 15 from the reader/writer 20. The interrupt signal corresponds to a notification of an update of information in the storage 154.

When an interrupt signal is input, the controller 14 first waits for X second(s) (Step S6). The length of the waiting time, X second(s), is the time set in Step S2. Thereafter, the controller 14 makes a reading request to the RFID device 15 to read display information from the first region 157 of the storage 154 (Step S7). Then, the controller 14 drives the display 13 in accordance with the read display information to update the display content (Step S8). After the update, the controller 14 returns the process to Step S5 to repeat the process from Step S5.

<Examples of Operation>

Figure 4:
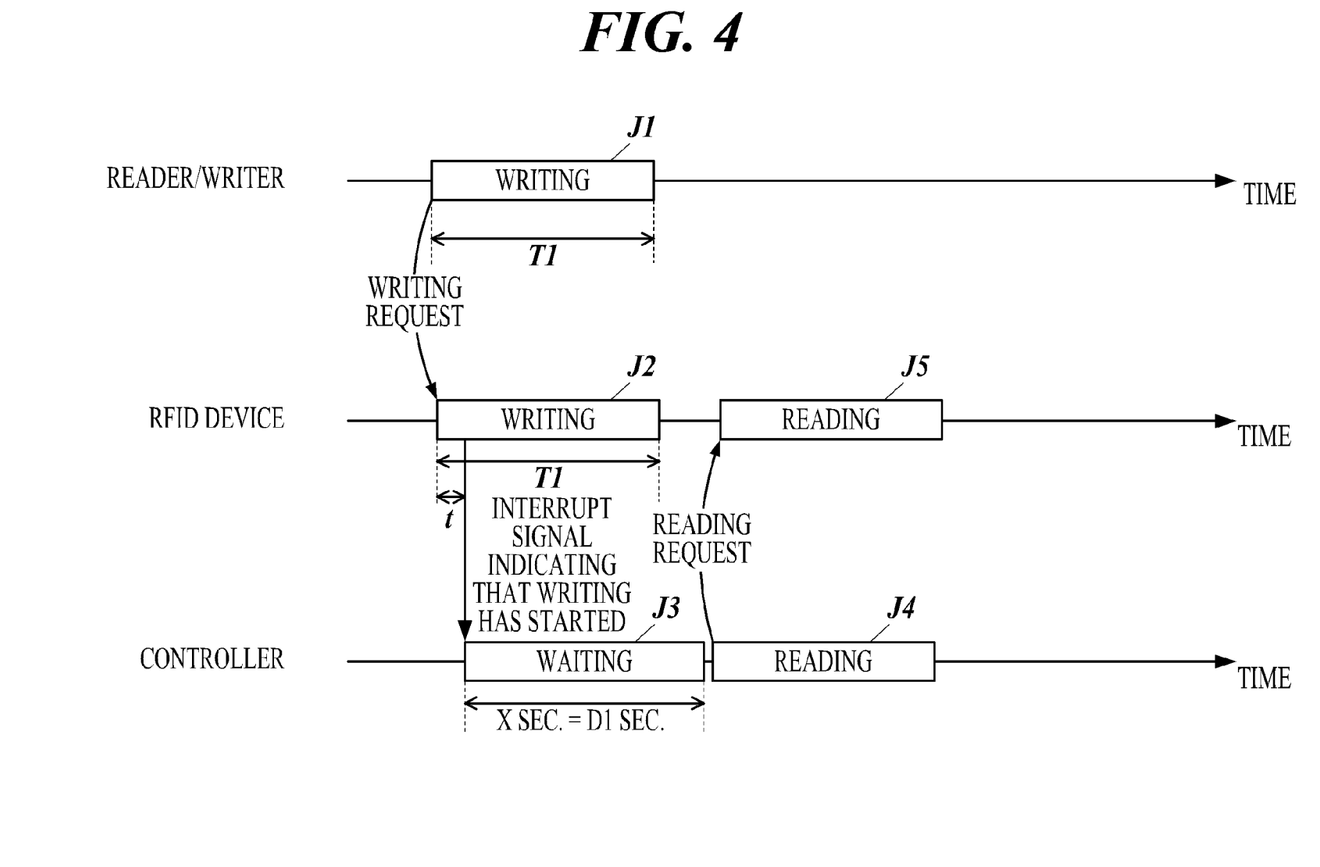
FIG. 4 is a timing chart for explaining operation in a first example at the time of an update of display information.
Figure 5:
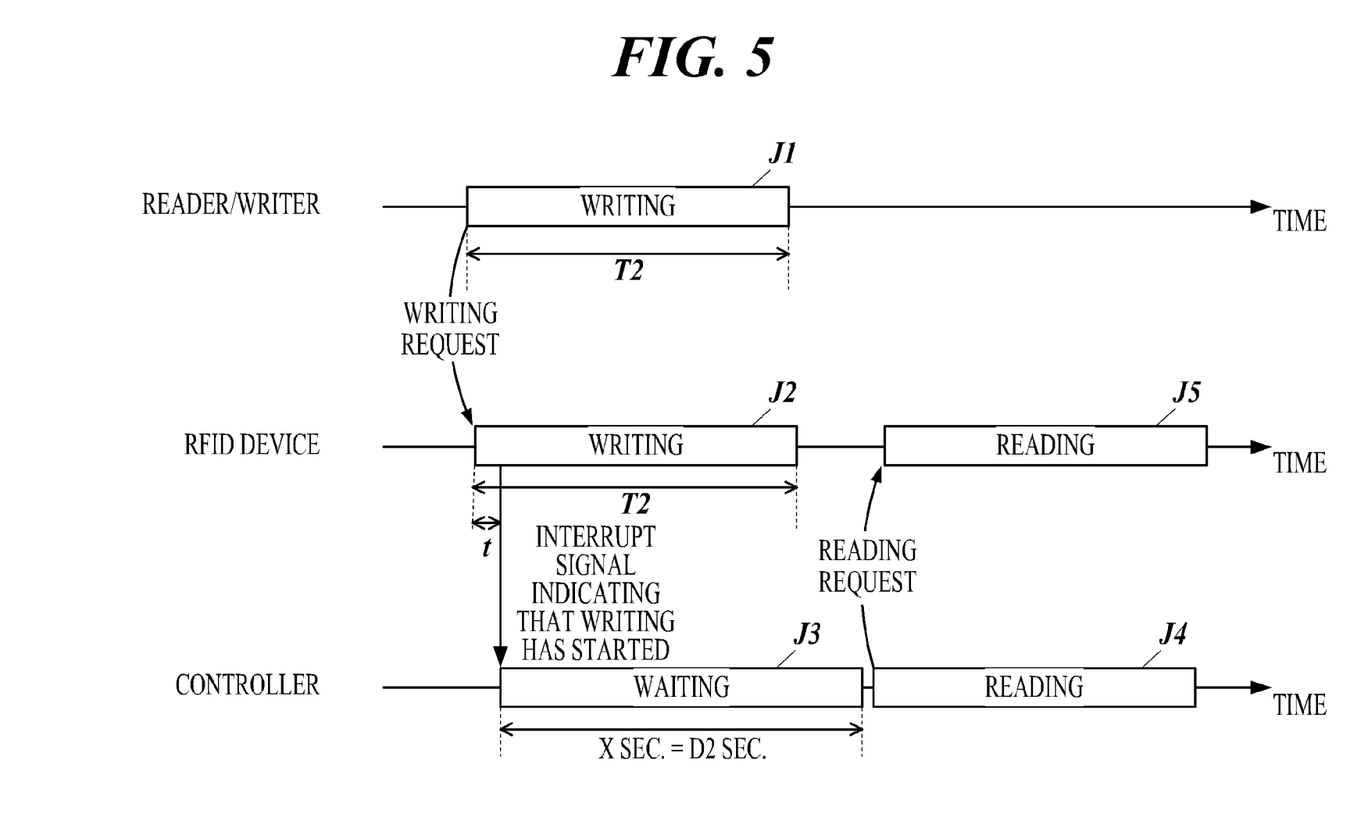
FIG. 5 is a timing chart for explaining operation in a second example at the time of an update of display information.

Next, examples of setting of the waiting time of X seconds and operation of the RFID tag 10 based on the above-described control process will be described. FIG. 4 and FIG. 5 are timing charts for explaining the operation in a first example and the operation in a second example at the time of an update of display information, respectively.

In a case where a use of the RFID tag 10 (an article to which the RFID tag 10 is to be attached) is already determined, the data length of information that is displayed on/by the display 13 does not greatly change from update to update of display. As shown in FIG. 4, at the time of an update of display, the reader/writer 20 performs a writing process J1 by taking a time length T1 proportional to the data length, and in response to a writing request therefrom at the time, the RFID device 15 performs a writing process J2, thereby writing new information into the storage 154.

When the writing process J2 to the storage 154 is started, after an elapse of a predetermined delay time t, an interrupt signal, which indicates that writing has started, is input to the controller 14 for the display 13, and on the basis of this, the controller 14 performs a waiting process J3 for the set waiting time of X seconds. The waiting process J3 in FIG. 4 corresponds to the process of Step S6 in FIG. 3. After the waiting process J3, the controller 14 performs a reading process J4 of the updated information, and in response to a reading request therefrom at the time, the RFID device 15 performs a reading process J5 and sends the updated display information to the controller 14. The waiting process J3 and the reading process J4 in FIG. 4 correspond to the process of Step S6 and the process of Step S7 in FIG. 3, respectively.

As shown in FIG. 4, to the RFID device 15, the reader/writer 20 makes the writing request, and the controller 14 makes the reading request. When a time interval between these two requests is short, the writing process J2 and the reading process J5 compete with one another (cause conflict), which results in failure of the processes. In this embodiment, however, the controller 14 performs the waiting process J3, which makes it possible to avoid such competition and prevent failure of the writing process J2 and the reading process J5.

The waiting time of X seconds of the waiting process J3 can be changed by a user rewriting the value in the second region 158 of the storage 154 with the reader/writer 20. The waiting time of X seconds is set to a value proportional to the data length of information that is written from the reader/writer 20 at the time of an update of display information; for example, to a time corresponding to the time length T1 of the writing process J1 by the reader/writer 20. Such setting makes it possible to avoid competition between the writing process J2 and the reading process J5, and also reduce a useless waiting time, thereby reducing a delay(s) in the process(es).

The data length of information that is written from the reader/writer 20 may be different from user to user or from article to article that is managed by the RFID tag 10. The timing chart of FIG. 5 shows a case where the data length of information that is written from the reader/writer 20 is long. The timing chart of FIG. 5 is the same as that of FIG. 4 in contents of the process. As shown in FIG. 4 and FIG. 5, the time lengths T1 and T2 required for the writing process J1 are different from one another according to the data length of information, and accordingly the time lengths T1 and T2 of the writing process J2 that is performed by the RFID device 15 are different from one another. When the time lengths T1 and T2 of the writing process J2 are different from one another, the waiting time of X seconds for avoiding the competition differs. For example, if the short waiting process J3 in FIG. 4 were applied to the long writing process J2 in FIG. 5, competition would occur between the writing process J2 and the subsequent reading process J5, but because the long waiting process J3 in FIG. 5 is applied thereto, competition between the writing process J2 and the reading process J5 is avoided.

For that, at the time of setting of the RFID tag 10, the user obtains an appropriate value of the waiting time of X seconds proportional to the data length of information to write into the RFID tag 10 at the time of an update of display, and writes the value into the second region 158 of the storage 154 with the reader/writer 20. Thereafter, the RFID tag 10 is powered or restarted for being reset or the like, and the controller 14 performs the processes of Step S1 and Step S2 in FIG. 3, thereby completing setting of the appropriate waiting time of X seconds. For example, in the case of the data length shown in FIG. 4, the data value "D1 sec." corresponding thereto is written, so that this value is set as the waiting time of X seconds. In the case of the data length in FIG. 5, the data value "D2 sec." corresponding thereto is written, so that this value is set as the waiting time of X seconds. As shown in FIG. 4 and FIG. 5, such setting makes it possible to avoid competition between the writing process J2 and the reading process J5, and also reduce a useless waiting time, thereby reducing a delay(s) in the process(es).

COMPARATIVE EXAMPLES

Figure 6:
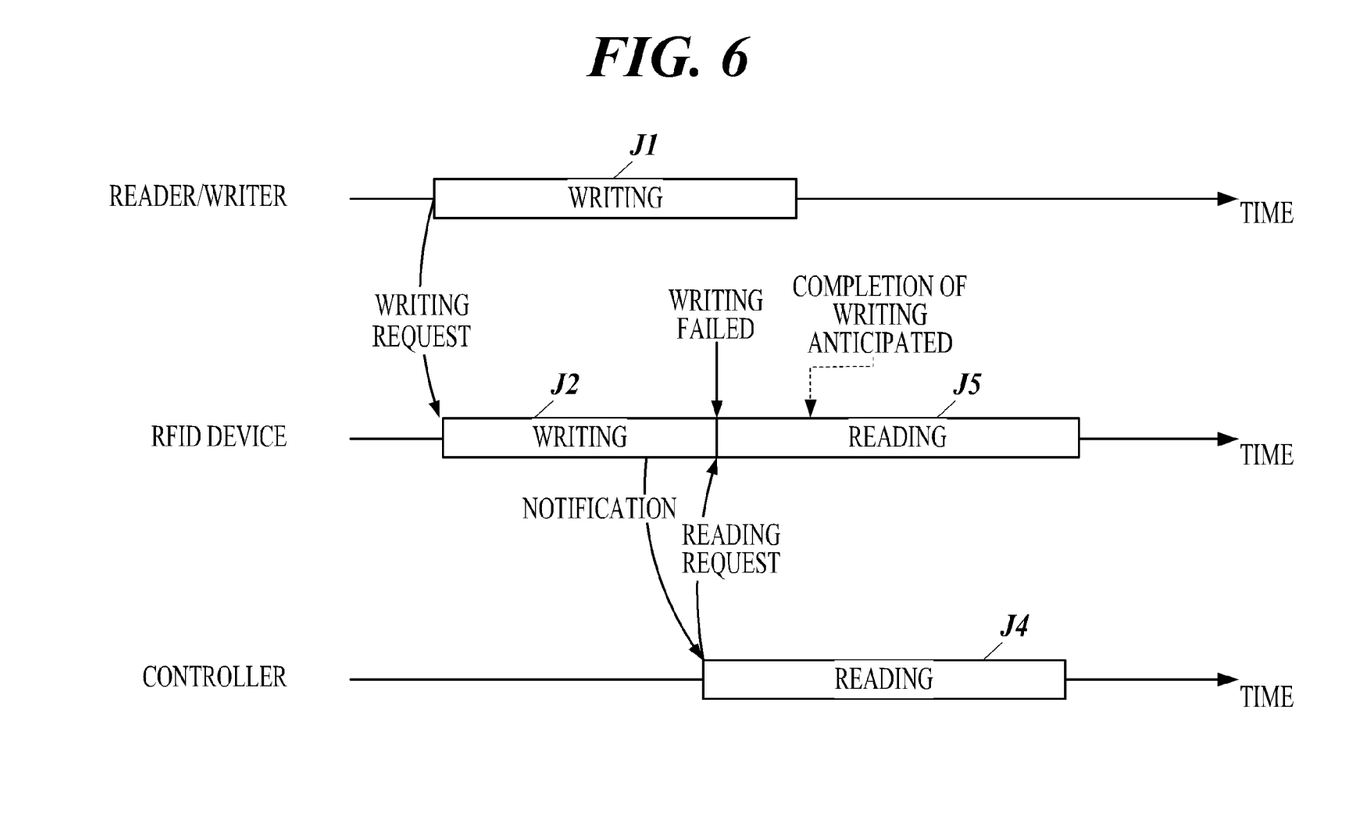
FIG. 6 is a timing chart for explaining operation in a first comparative example at the time of an update of display information.
Figure 7:
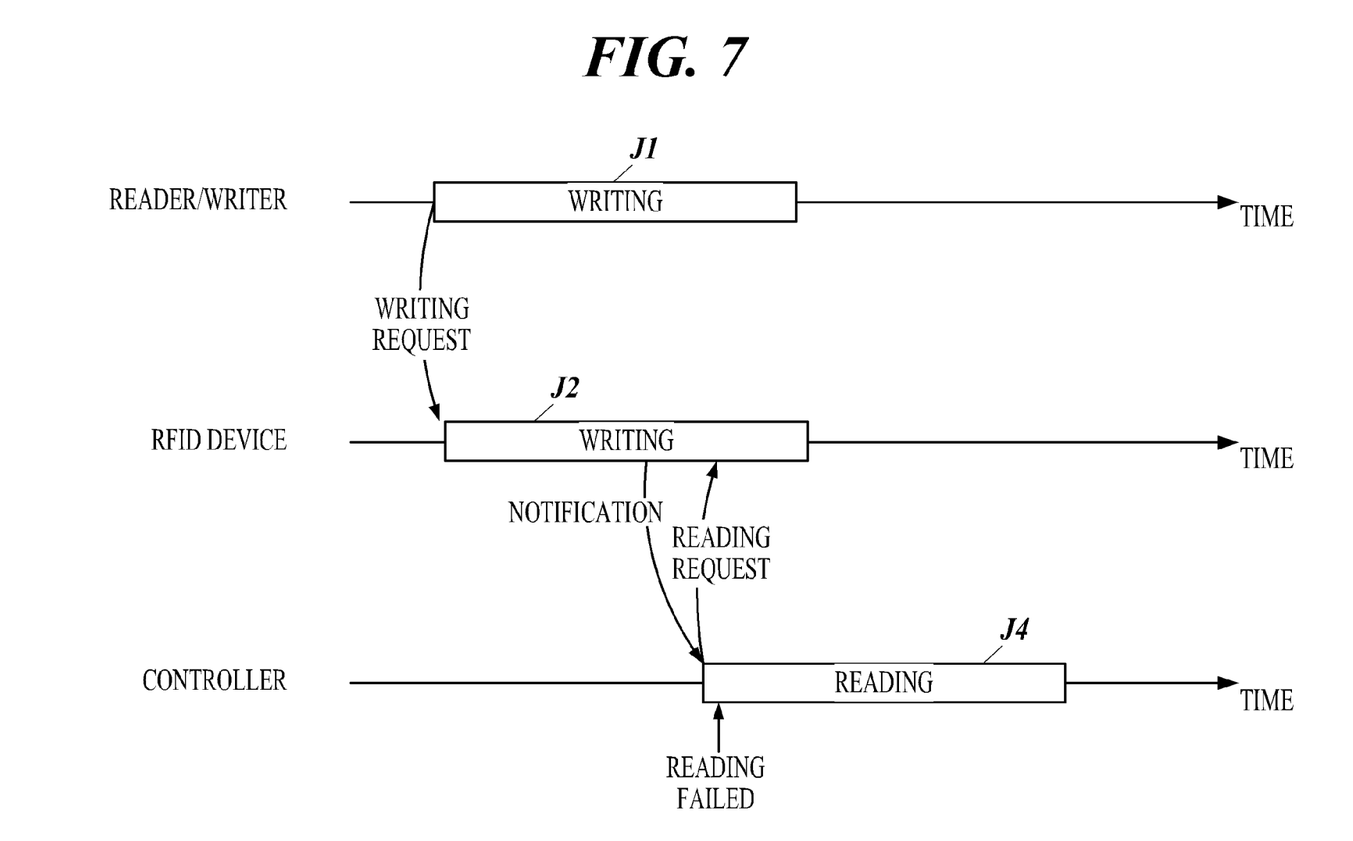
FIG. 7 is a timing chart for explaining operation in a second comparative example at the time of an update of display information.

Next, as comparative examples, examples in which processes by the RFID device 15 are prioritized for avoiding competition between a writing process and a reading process will be described. FIG. 6 and FIG. 7 are timing charts for explaining operation in a first comparative example and operation in a second comparative example at the time of an update of display information.

The first comparative example shown in FIG. 6 is an example in which processes by the RFID device 15 are prioritized such that a reading request from the controller 14 has a higher priority than a writing request from the reader/writer 20. By the priority of one of these requests being made higher, even when a writing request and a reading request are made at close timings, the RFID device 15 can avoid uncertainty as to which process to perform, the writing process J2 or the reading process J5. However, as shown in FIG. 6 as an example, in a case where the data length of information to write is long, while the RFID device 15 is performing the writing process J2, the controller 14 may make a reading request. In this case, before completion of the writing process J2, the reading process J5 is started due to its priority, so that the writing process J2 fails.

The second comparative example shown in FIG. 7 is an example in which between a writing request from the reader/writer 20 and a reading request from the controller 14, a request made earlier has a higher priority. By such priority setting, even when a writing request and a reading request are made at close timings, the RFID device 15 can avoid uncertainty as to which process to perform, the writing process or the reading process. As shown in FIG. 7 as an example, in a case where the data length of information to write is long, while the RFID device 15 is performing the writing process J2, the controller 14 may make a reading request. In this case, the RFID device 15 gives priority to the writing request made earlier by the reader/writer 20 and does not perform the reading process J5 for the reading request from the controller 14, so that the reading process J4 by the controller 14 fails Contrary to the priority setting shown in FIG. 7, when a request made later has a higher priority, although not shown, during the writing process J2, the RFID device 15 starts a reading process for the reading request from the controller 14. In this case, the writing process J1/J2 by/for the reader/writer 20 stops in the middle and fails.

Thus, regardless of which condition is used to prioritize processes by the RFID device 15, when a writing request and a reading request are made at close timings, a process for one of these fails. However, as shown in FIG. 3 and FIG. 4, in this embodiment, the waiting time is set appropriately. This makes it possible to avoid competition between a writing process and a reading process, thereby preventing the writing process and the reading process from failing.

As described above, according to the RFID tag 10 and the RFID tag system 1 of this embodiment, when display information is written into the storage 154 from the reader/writer 20, the controller 14 for the display 13 reads the display information from the storage 154 after an elapse of the waiting time of X seconds. The waiting time can be changed to an appropriate value by writing setting data thereof into the RFID tag 10 from the reader/writer 20. Hence, even when the data length of information that is written from the reader/writer 20 for updating display information is different from user to user, the waiting time appropriately proportional/corresponding to the data length can be set. This makes it possible, at the time of an update of display information, to start a reading process for/by the controller 14 after completing a writing process for/by the reader/writer 20, thereby preventing these processes from failing. Further, when the data length of information that is written is short, the waiting time of X seconds can be set to a short time accordingly. This makes it possible to shorten the time from the completion of a writing process to the start of a reading process, thereby reducing a delay(s) in the process(es). Hence, after a writing process from the reader/writer 20, the user can promptly check an update of the display content and confirm that the writing process has been performed normally.

Further, according to the RFID tag 10 and the RFID tag system 1 of this embodiment, at the time of start-up, such as at the time of power-on or at the time of resetting, the controller 14 for the display 13 reads setting data of the waiting time from the storage 154 of the RFID device 15 and sets the waiting time. This can prevent the waiting time from changing in error or the like during continuous use of the RFID tag 10. Further, this can reduce the number of times that the controller 14 reads setting data of the waiting time, reduce the processing load, and shorten the time required for a reading process(es) of information at normal time other than at the time of start-up.

In the above, an embodiment(s) has been described. In the above embodiment, as an output device that outputs information, the display capable of dot display is used. However, the output device may be any device as far as it is capable of outputting information to the outside. Examples thereof include: a sound output device, such as a speaker; a display device that lights or flashes one or more lamps; and a wireless communication device that sends information via a wireless LAN (Local Area Network). Further, the power source of the RFID tag may be changed variously in structure. For example, instead of the solar cell, a primary battery or a secondary battery (storage battery) as a chemical battery or a combination of a solar cell and a secondary battery may be used. Further, details of the embodiment, such as presence or absence of the host computer in the system, can be appropriately changed within a range not departing from the scope of the present disclosure. The description of the embodiment is illustrative in every aspect, and hence the present invention is not limited thereto. The present disclosure is applicable to the embodiment subjected to appropriate combination, change, replacement, addition, omission and/or the like of the detail(s) as far as there is no inconsistency. It is appreciated that not-shown numerous modifications can be envisaged without departing from the scope of the present invention.

INDUSTRIAL APPLICABILITY

The present disclosure is applicable to an RFID tag and an RFID tag system.

The invention claimed is:

1. An RFID tag comprising:
an RFID device including a storage into which data is writable from a writing apparatus through wireless communication; and
a controller that reads object information of output stored in the storage and causes an output device to output the read object information,
wherein when detecting that the object information has started to be written into the storage from the writing apparatus, the controller waits for a waiting time and thereafter reads the object information,
wherein the storage includes a storage region into which setting data of the waiting time is writable from the writing apparatus, and
wherein the setting data of the waiting time has been written from the writing apparatus and stored in the storage region.

2. The RFID tag according to claim 1, wherein at a time of start-up of the controller, the controller reads the setting data of the waiting time from the RFID device and sets the waiting time based on the read setting data.

3. The RFID tag according to claim 1, wherein the waiting time is determined based on a data length of the object information.

4. An RFID tag system comprising:
an RFID tag; and
a writing apparatus capable of writing data into the RFID tag through wireless communication,
wherein the RFID tag includes:
an output device capable of outputting information;
an RFID device including a storage into which data is writable from the writing apparatus and an antenna; and
a controller that reads object information of output stored in the storage and causes the output device to output the read object information,
wherein when detecting that the object information has started to be written into the storage from the writing apparatus, the controller waits for a waiting time and thereafter reads the object information,
wherein the storage includes a storage region into which setting data of the waiting time is writable from the writing apparatus, and
wherein the setting data of the waiting time has been written from the writing apparatus and stored in the storage region.

5. The RFID tag system according to claim 4, wherein at a time of start-up of the controller, the controller reads the setting data of the waiting time from the RFID device and sets the waiting time based on the read setting data.

6. The RFID tag system according to claim 4, wherein the waiting time is determined based on a data length of the object information.

* * * * *